(12) United States Patent
Wronski

(10) Patent No.: US 7,735,795 B2
(45) Date of Patent: Jun. 15, 2010

(54) HANGAR BAR FOR RECESSED LUMINAIRES WITH INTEGRAL NAIL

(75) Inventor: Grzegorz Wronski, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 12/122,945

(22) Filed: May 19, 2008

(65) Prior Publication Data

US 2008/0217500 A1 Sep. 11, 2008

Related U.S. Application Data

(63) Continuation of application No. 11/090,654, filed on Mar. 25, 2005, now Pat. No. 7,673,841.

(51) Int. Cl.
*B42F 13/00* (2006.01)

(52) U.S. Cl. .................. 248/343; 248/200.1; 248/344

(58) Field of Classification Search ............... 248/323, 248/342, 343, 200.1, 906
See application file for complete search history.

(56) References Cited

U.S. PATENT DOCUMENTS

| | | | |
|---|---|---|---|
| 1,156,885 A | 10/1915 | Caine | |
| 1,622,087 A | 3/1927 | Calderwood | |
| 1,756,361 A | 4/1930 | Johnson | |
| 1,791,480 A | 2/1931 | Smith et al. | |
| 2,316,389 A | 4/1943 | Atkinson | |
| 2,518,515 A | 8/1950 | Austin | |
| 2,658,241 A | 11/1953 | Houghton et al. | |
| 2,713,983 A | 7/1955 | Kay | |
| 2,802,933 A | 8/1957 | Broadwin | |
| 2,933,549 A | 4/1960 | Antonucci | |
| 3,102,306 A | 9/1963 | Hutchinson | |
| 3,104,087 A | 9/1963 | Budnick et al. | |
| 3,597,889 A | 8/1971 | Nigro | |
| 4,149,693 A | 4/1979 | LoNigro | |
| 4,336,575 A * | 6/1982 | Gilman | 362/147 |
| 4,511,113 A | 4/1985 | Druffel et al. | |
| 4,757,967 A | 7/1988 | Delmore et al. | |
| 4,796,169 A | 1/1989 | Shemitz | |
| 4,967,990 A | 11/1990 | Rinderer | |
| 4,972,339 A | 11/1990 | Gabrius | |
| 5,045,985 A | 9/1991 | Russo et al. | |
| 5,176,345 A | 1/1993 | Medlin | |

(Continued)

OTHER PUBLICATIONS

Halo Lighting. "Edison Recessed Lighting", Cooper Industries, No. ADV 693025, Jan. 1984.

(Continued)

*Primary Examiner*—J. Allen Shriver, II
*Assistant Examiner*—Steven M Marsh
(74) *Attorney, Agent, or Firm*—King & Spalding LLP

(57) ABSTRACT

A hanger bar assembly for a recessed luminaire is disclosed. The hanger bar assembly includes a first hanger bar member having a first attachment structure disposed on an end thereof, and a second hanger bar member having a second attachment structure disposed on an end thereof, the second hanger bar member being adjacent to the first hanger bar member. The first and the second attachment structures each include a first wall having a first fastener aperture and a second wall having a second fastener aperture, the first and second fastener apertures being formed about a common central longitudinal axis.

20 Claims, 13 Drawing Sheets

U.S. PATENT DOCUMENTS

| | | | |
|---|---|---|---|
| 5,209,444 A | 5/1993 | Rinderer | |
| 5,222,800 A | 6/1993 | Chan et al. | |
| 5,386,959 A | 2/1995 | Laughlin et al. | |
| 5,505,419 A | 4/1996 | Gabrius | |
| 5,619,263 A | 4/1997 | Laughlin et al. | |
| 5,623,789 A | 4/1997 | Kidwell et al. | |
| 5,662,414 A | 9/1997 | Jennings et al. | |
| 5,678,399 A | 10/1997 | Baron | |
| 5,690,423 A | 11/1997 | Hentz et al. | |
| 5,746,507 A | 5/1998 | Lee | |
| 5,758,959 A | 6/1998 | Sieczkowski | |
| 5,845,886 A | 12/1998 | McCormick | |
| 5,857,766 A | 1/1999 | Sieczkowski | |
| 5,873,556 A | 2/1999 | Reiker | |
| 5,934,631 A | 8/1999 | Becker et al. | |
| 5,954,304 A | 9/1999 | Jorgensen | |
| 5,957,573 A | 9/1999 | Wedekind et al. | |
| 5,957,574 A | 9/1999 | Hentz et al. | |
| 6,004,011 A * | 12/1999 | Sieczkowski | 362/365 |
| 6,030,102 A | 2/2000 | Gromotka | |
| 6,033,098 A | 3/2000 | Hentz et al. | |
| 6,076,788 A | 6/2000 | Akiyama | |
| 6,082,878 A | 7/2000 | Doubek et al. | |
| 6,105,918 A | 8/2000 | Gromotka | |
| 6,123,438 A * | 9/2000 | Hentz | 362/373 |
| 6,164,802 A | 12/2000 | Gromotka | |
| 6,176,599 B1 * | 1/2001 | Farzen | 362/365 |
| 6,216,992 B1 | 4/2001 | Bisonaya et al. | |
| 6,231,205 B1 | 5/2001 | Slesinger et al. | |
| 6,272,794 B1 * | 8/2001 | Rippel et al. | 52/27 |
| 6,286,265 B1 | 9/2001 | Rinderer | |
| 6,296,211 B1 | 10/2001 | Snyder | |
| 6,332,597 B1 | 12/2001 | Korcz et al. | |
| 6,357,891 B1 * | 3/2002 | Newbold et al. | 362/147 |
| 6,431,723 B1 | 8/2002 | Schubert et al. | |
| 6,461,016 B1 | 10/2002 | Jamison et al. | |
| 6,471,374 B1 | 10/2002 | Thomas et al. | |
| 6,484,980 B2 | 11/2002 | Medlin, Sr. et al. | |
| 6,505,960 B2 | 1/2003 | Schubert et al. | |
| 6,519,791 B2 | 2/2003 | Randolph | |
| 6,527,406 B1 | 3/2003 | Slesinger et al. | |
| 6,609,690 B1 | 8/2003 | Davis | |
| 6,632,006 B1 * | 10/2003 | Rippel et al. | 362/366 |
| 6,637,705 B2 | 10/2003 | Sjoblom et al. | |
| 6,669,198 B2 | 12/2003 | Wichinsky | |
| 6,688,069 B2 | 2/2004 | Zadeh | |
| 6,726,347 B2 | 4/2004 | Wronski | |
| 6,805,916 B2 | 10/2004 | Cadieu | |
| 6,838,618 B2 * | 1/2005 | Newbold et al. | 174/50 |
| 7,114,294 B2 * | 10/2006 | Newbold et al. | 52/28 |
| 7,216,838 B1 * | 5/2007 | Gretz | 248/200.1 |
| 2005/0183344 A1 | 8/2005 | Ziobro et al. | |
| 2005/0730589 | 10/2005 | Wronski | |
| 2005/0247842 A1 | 11/2005 | Wronski | |
| 2007/0075206 A1 | 4/2007 | Wright et al. | |
| 2007/0261881 A1 | 11/2007 | Wronski | |

OTHER PUBLICATIONS

"Edison Lighting", ET 7001 P, Cooper Industries, 694917, Sep. 1989.
"Edison Lighting", ET 7070, ET 7071, ET7301, ET7401, ET 7410, Cooper Industries, 694979, Dec. 1987.
Sears Owner's Manual, Model No. 9 89575, 694954, Oct. 1987.
Halo,H-7T, H-27T, H-71CT. H274, H275, Bar Hanger Installation Instruction, 695876, Jun. 1989.
Halo H& Housing with Improved Plaster Frame, Cooper Industries, 692601, Jul. 1981.
U.S. Appl. No. 11/809,785, Grzegorz Wronski.

\* cited by examiner

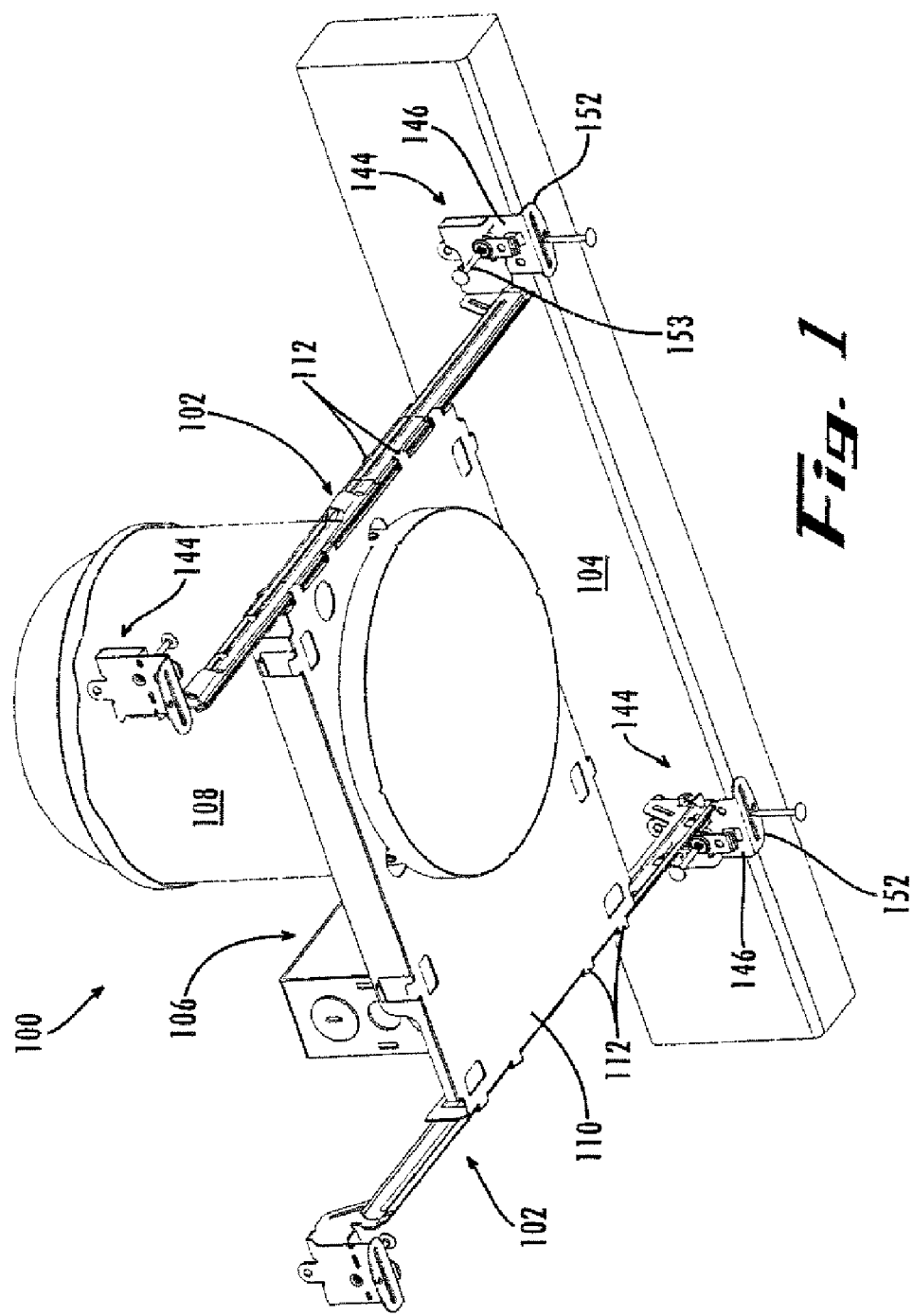

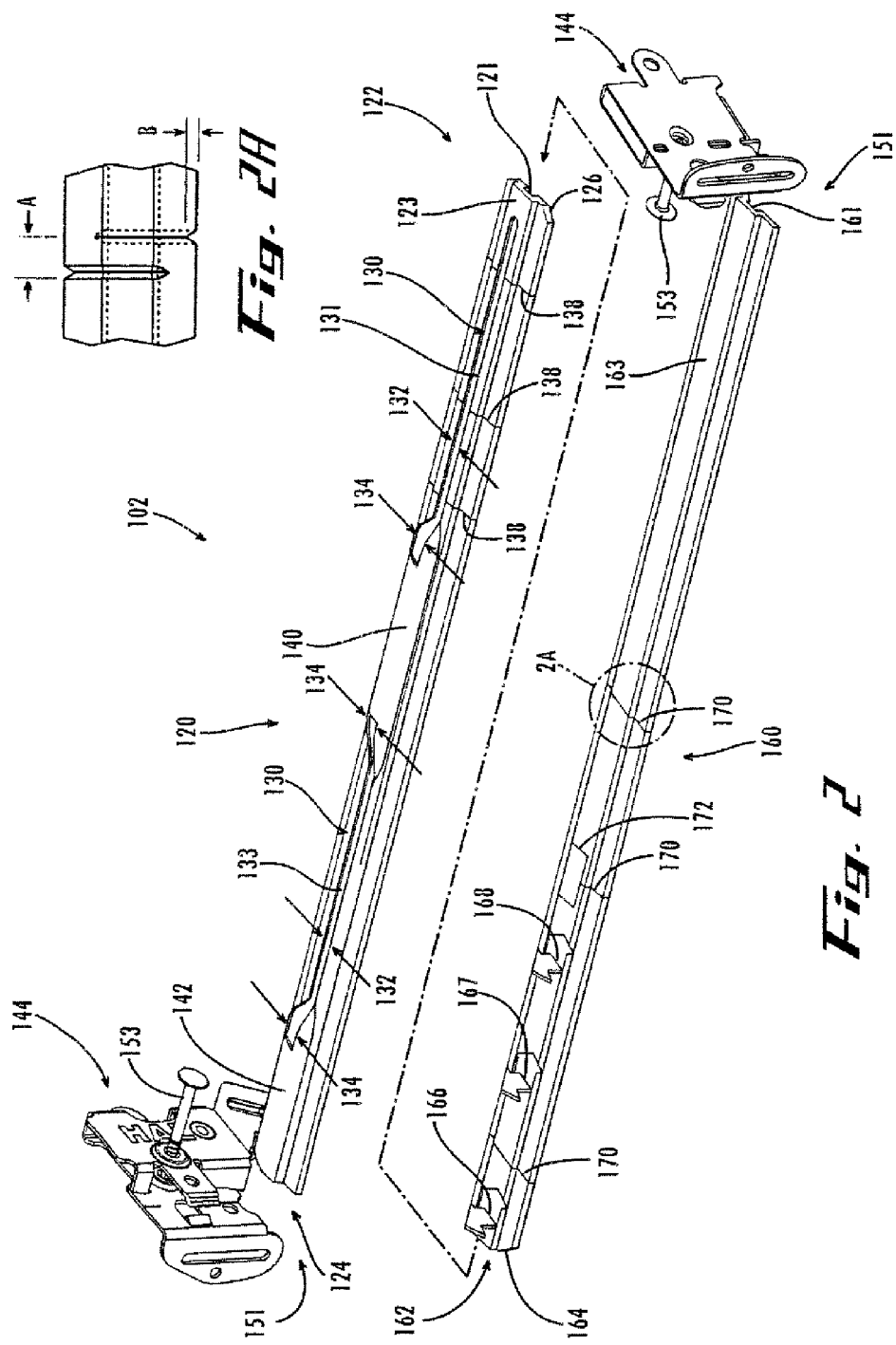

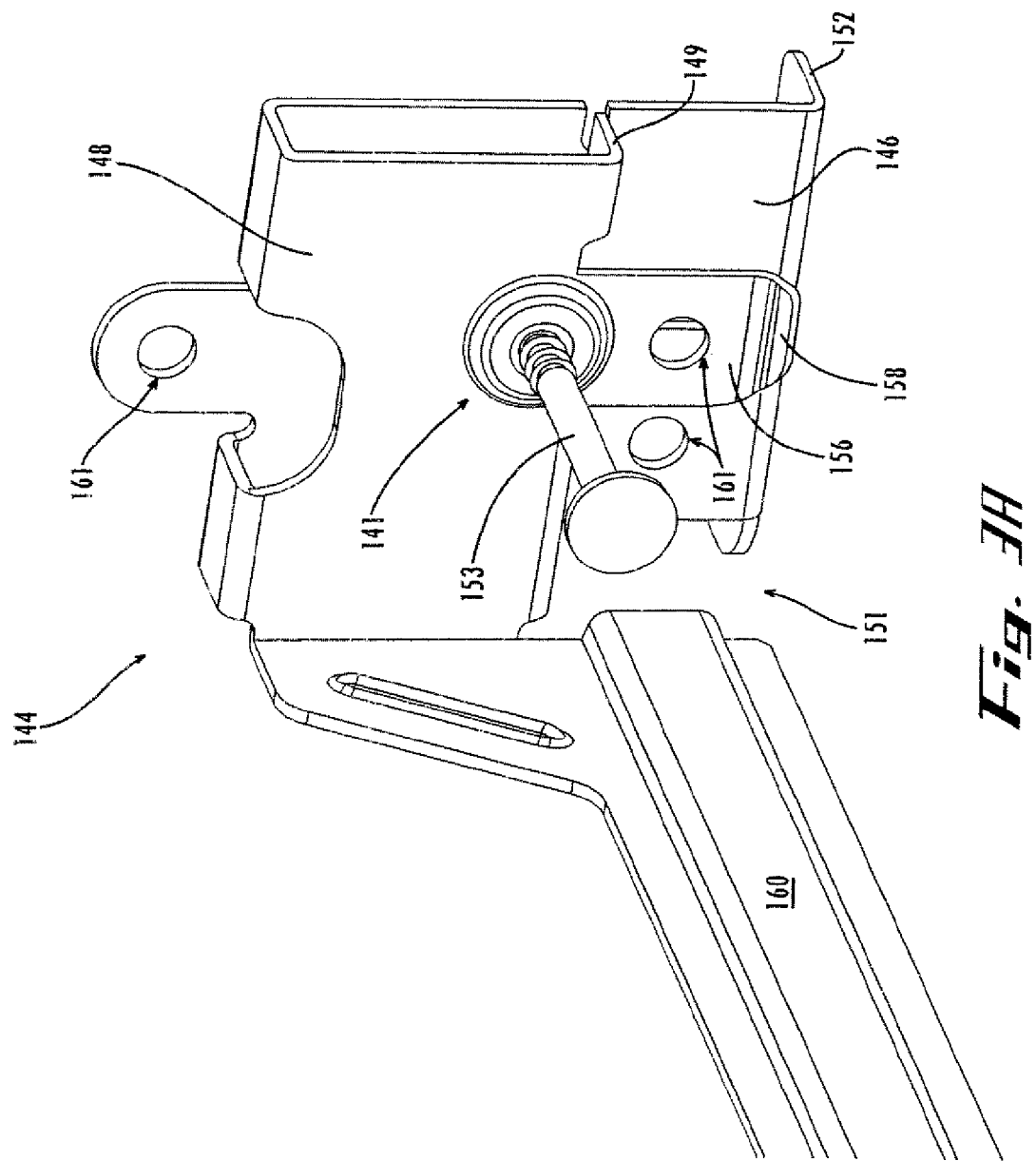

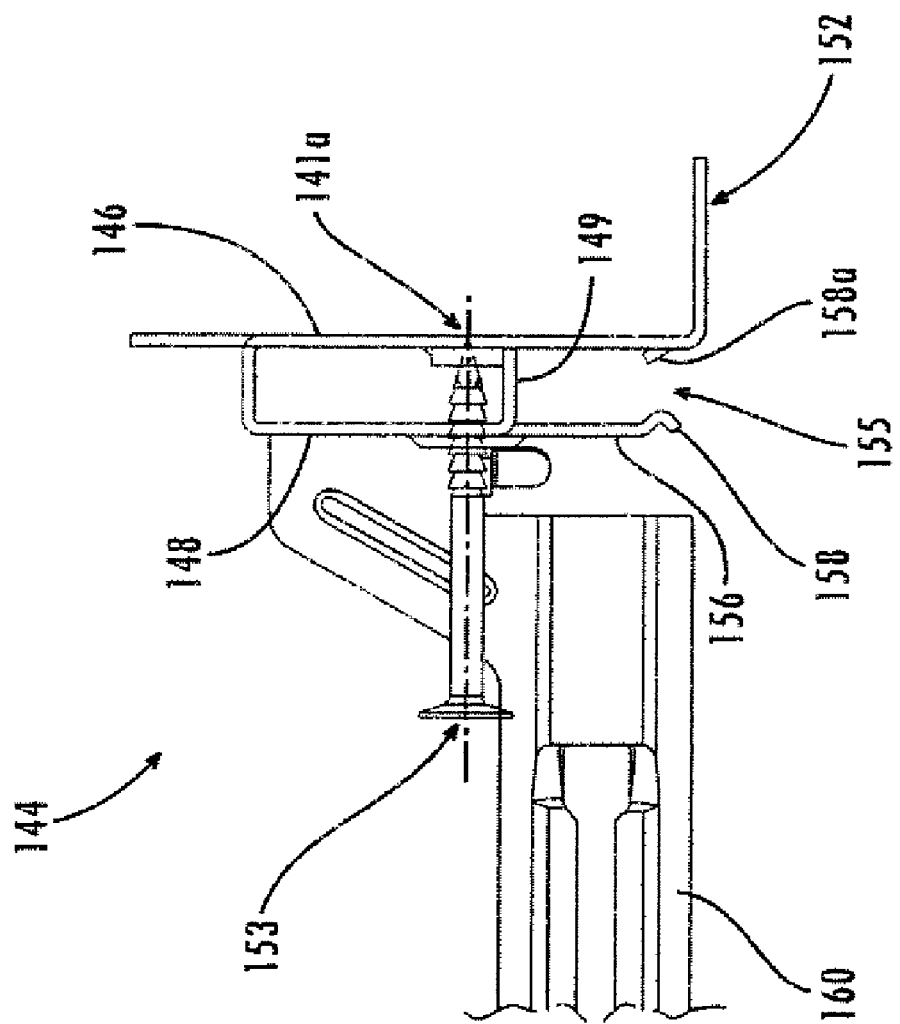

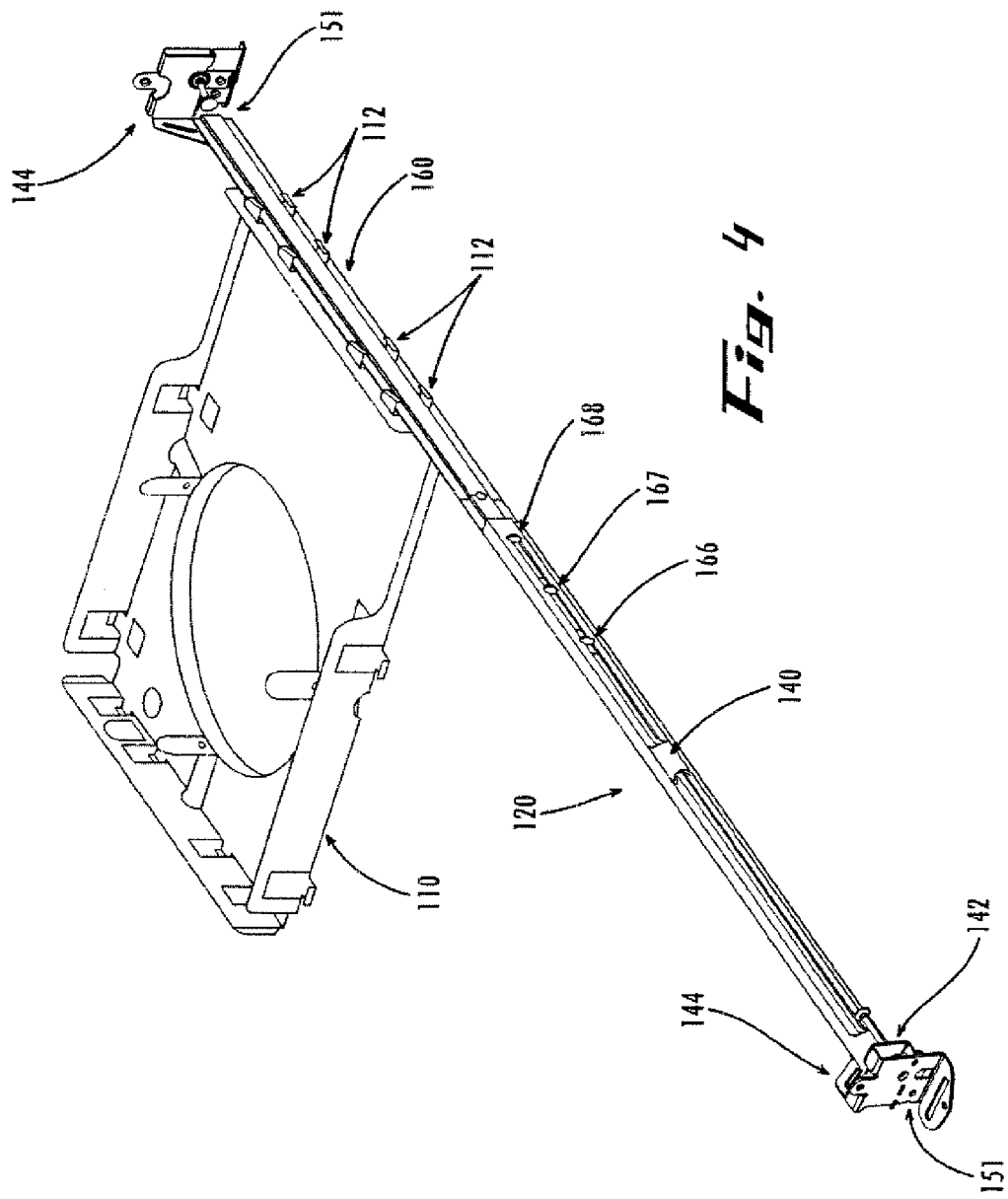

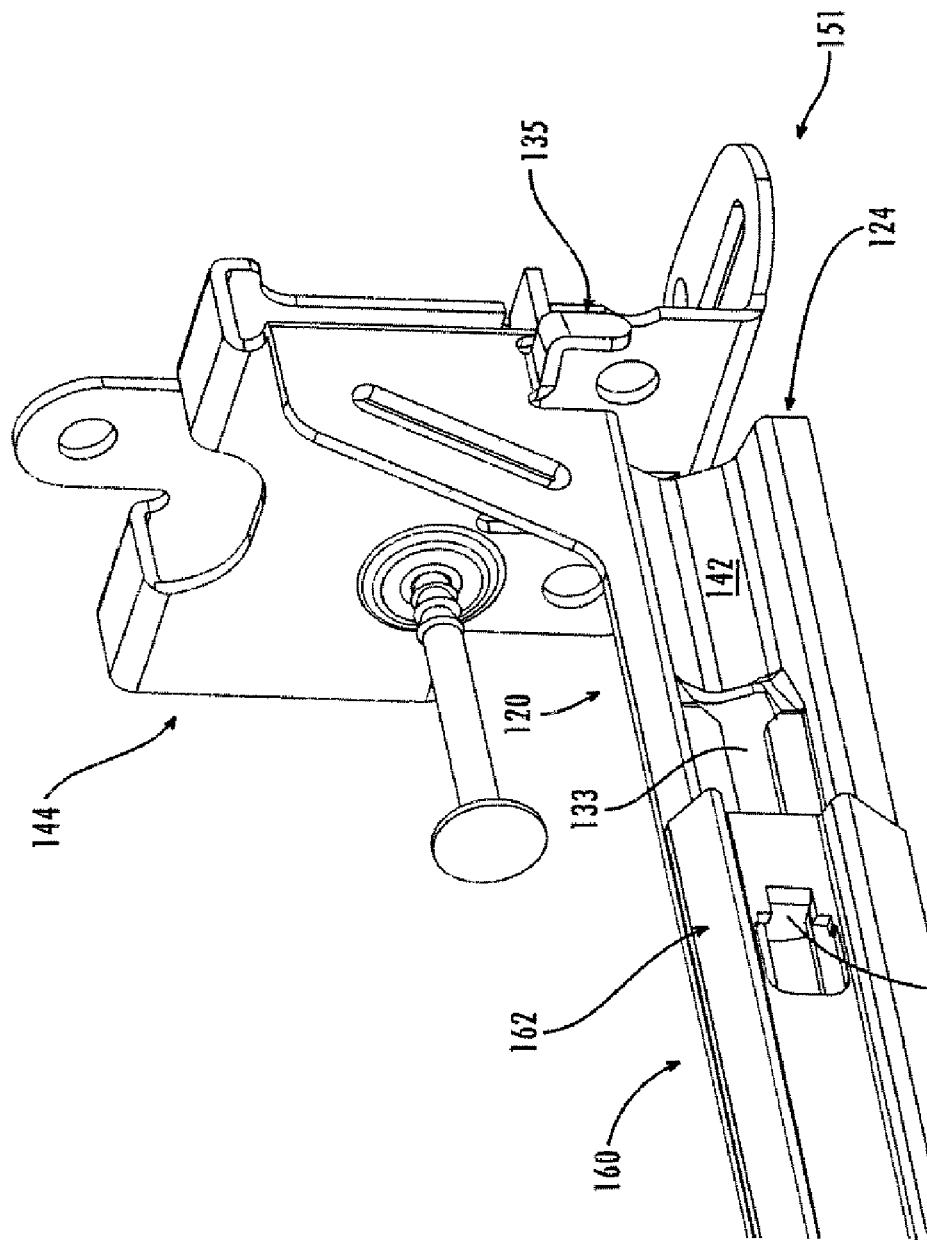

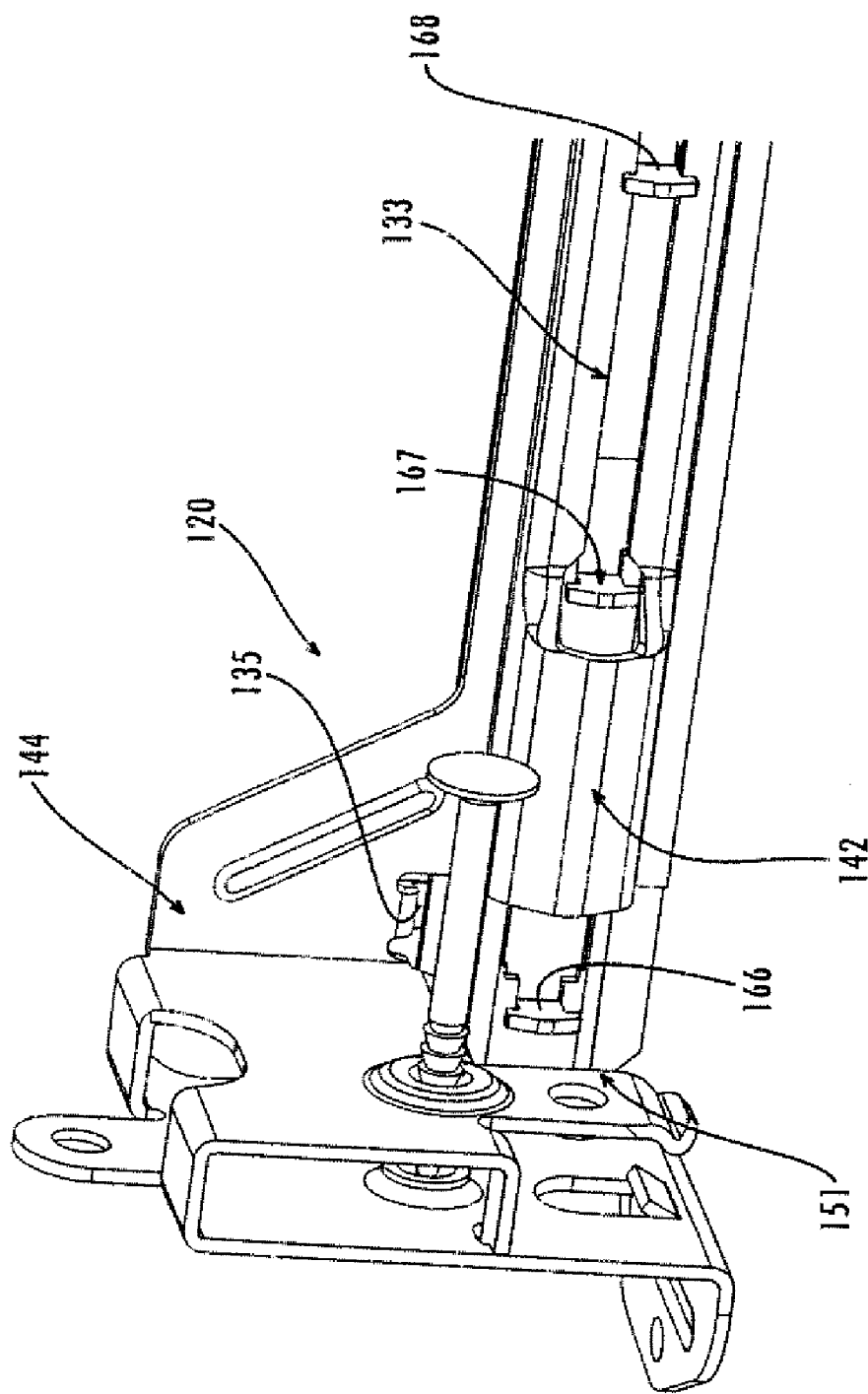

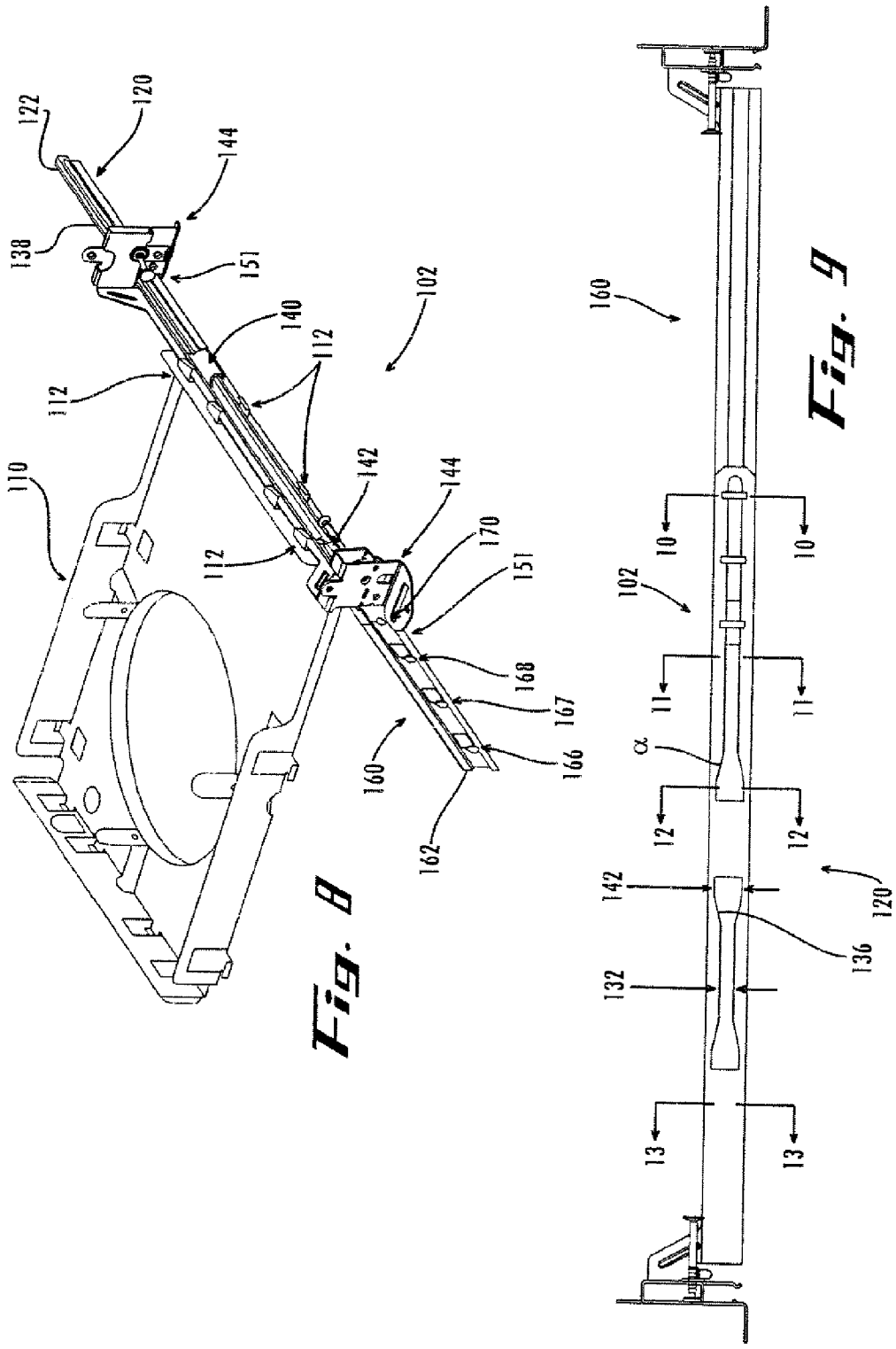

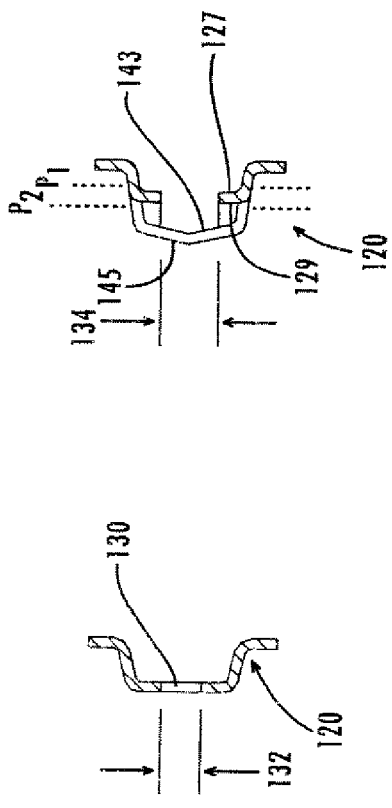
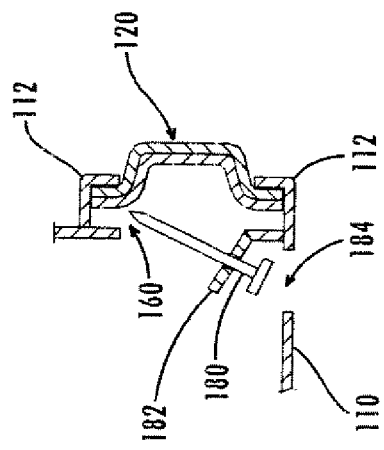
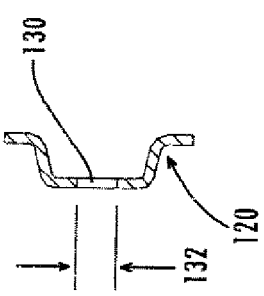
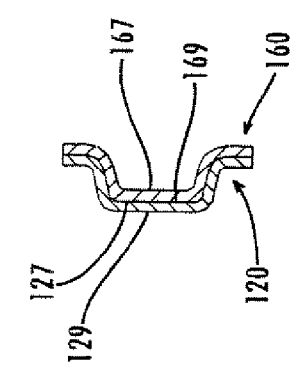
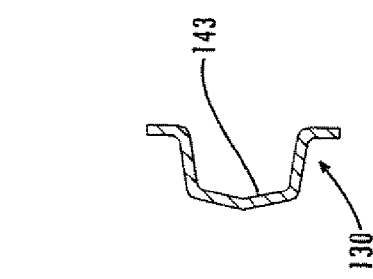

HANGAR BAR FOR RECESSED LUMINAIRES WITH INTEGRAL NAIL

CROSS REFERENCE TO RELATED APPLICATION

This application is a continuation of and claims priority to U.S. patent application Ser. No. 11/090,654 filed Mar. 25, 2005, now U.S. Pat. No. 7,673,841 entitled, "Hangar Bar For Recessed Luminaires with Integral Nail," the entire contents of which are hereby incorporated by reference.

TECHNICAL FIELD

This disclosure generally relates to support brackets on an extensible column mounted between two surfaces such as ceiling attachment fittings, and, more particularly, to hanger bar assemblies for recessed luminaires.

BACKGROUND

The "INESA Lighting Handbook" published by the Illuminating Engineering Society of North America, is incorporated by reference here in its entirety. As discussed in chapter seven of that handbook, a "luminaire" is a device for producing, controlling, and distributing light. It is typically a complete lighting unit consisting of one or more lamps, sockets for positioning and protecting the lamps and for connecting the lamps to a supply of electric power, optical devices for distributing the light, and mechanical components for supporting or attaching the luminaire. Luminaires are also sometimes referred to as "light fixtures."

Luminaires are usually classified by their application, such as residential, commercial, or industrial. However, a particular luminaire can often be used in more than one application, depending upon its performance characteristics. For example, recessed downlights are used in both commercial and residential applications where they are typically mounted behind a ceiling wall with an opening to produce illuminance on the floor or workplace below.

Various support systems have been employed to carry recessed luminaires in buildings and other structures. For example, recessed fixtures are often suspended between joists, or other parallel support structures, on a pair of "hanger bars" or "bar hangers" extending between the joists. Similar hanger bar arrangements are used to suspend recessed downlights between the rails in a suspended, tile ceiling.

These conventional hanger bars are often formed in one-piece with a fixed length so as to provide adequate structural rigidity at a relatively low cost. For example, U.S. Pat. No. 5,505,419 to Gabrius (assigned at issuance to Juno Lighting) is incorporated by reference here in its entirety and discloses a one-piece bar hanger having a stiffening rib that extends along substantially the entire length of the bar hanger. In order to change its length, the bar must be broken along a single score line. Since the length of the hanger bar cannot be variably adjusted, its use is often limited to joists, or other supports, having a standard and consistent spacing.

Hanger bars have also been devised with an adjustable two-piece configuration. For example, U.S. Pat. No. 5,029,794 to Wolfe (assigned at issuance to Prescolite) is incorporated by reference here and discloses a pair of bar hanger elements that are nested in a slidable relationship relative to each other. Each bar hanger element is identical in construction with an elongated slot and two retaining projections.

U.S. Pat. No. 4,723,747 to Karp et al. (assigned at issuance to Capri Lighting) is also incorporated by reference here and discloses a two-piece bar hanger with an elongated slot as well as a longitudinally extended "dome," or projection, to facilitate nesting. One of the hanger bar elements has an arrow-shaped retaining projection while the other hanger bar element has a foot-like retaining projection that is received within the slot.

As with single-piece hanger bars, two-piece hanger bars may be trimmed for use with smaller joist spacings. However, these hanger bar assemblies must generally be disassembled prior to altering their length. Furthermore, while such two-piece arrangements permit installation between supports or joists of various spacings, they generally suffer from a lack of stability that fails to provide adequate support for the suspended luminaire, especially when the hanger is installed in its fully-extended, or nearly fully-extended, position.

In this regard, U.S. Pat. No. 6,076,788 to Akiyama (assigned at issuance to Cooper Industries) is incorporated by reference here and discloses a hanger bar assembly with a first bar hanger having a plurality of longitudinal slots, each separated by a reinforcing formation. A second hanger bar member having a plurality of spaced retaining projections is interfitted with the first hanger bar member. At least one of the retaining projections engages at least one of the slots in order to couple the hanger bar members as they are extended longitudinally.

Each of the Akiyama hanger bar members may also include a score line for allowing a portion of the hanger bar member to be removed in order to reduce the overall length of the hanger bar assembly. Although such hanger bar assemblies generally provide adequate support in their fully-extended position, the hanger bar members must be separated in order to change their length by breaking each member along its score line. Furthermore, such conventional hanger bars can generally be used with only one particular type of ceiling configuration.

SUMMARY

These and other drawbacks of such conventional technologies are addressed here by providing a luminaire, such as a recessed downlight, with a hanger bar assembly. For example, the hanger bar assembly may include a first hanger bar member having a first attachment structure disposed on an end thereof and a second hanger bar member including a second attachment structure disposed on an end thereof, the second hanger bar member being adjacent to the first hanger bar member. The first and the second attachment structures each include a first wall having a first fastener aperture and a second wall having a second fastener aperture, the first and second fastener apertures being formed about a common central longitudinal axis.

The hanger bar assembly may also include a first fastener and a second fastener, possibly nails, each of the first and second fasteners being maintained in one of the first fastener apertures by a friction fit. Also, the first hanger bar member slidably engages the second hanger bar member, and the first wall and the second wall of both the first and second attachment structures are parallel.

Other embodiments of the hanger bar assembly may include an elongated slot on the first hanger bar member and at least two retaining projections disposed on the second hanger bar member, the retaining projections extending into the elongated slot. Also, at least one bridge spans the elongated slot to form a first slot portion and a second slot portion, wherein adjacent retaining projections are separated by a distance that is greater than the width of the bridge.

Yet another embodiment may include a second bridge disposed on a proximal end of the first hanger bar and spanning an end of the elongated slot, wherein the retaining projections slide beneath the second bridge and out of the elongated slot. The first and second attachment structures areconfigured to allow the first and second hanger bar members to slidably extend therebeyond, respectively.

Other embodiments may include at least a first stub extending between the first wall and the second wall of the first attachment structure, and a second stub extending between the first wall and the second wall of the second attachment structure. The first and second stubs are arranged and configured to maintain separation between their respective first and second walls. The first and the second stubs each extend from the respective first wall and toward the respective second wall.

Yet another embodiment of a hanger bar assembly includes a first mounting flange and a second mounting flange, each extending outwardly from a bottom edge of the second wall of one of the first attachment structure and the second attachment structure. The first and the second mounting flanges are perpendicular to the respective second wall and a first mounting slot is formed in the first mounting flange and a second mounting slot is formed in the second mounting flange.

Another embodiment of the hanger bar assembly includes a pair of mounting tabs, each mounting tab extending downwardly from a bottom edge of a respective first wall such that a gap is formed by the mounting tab and a portion of the respective first wall. Each gap is configured to slidably receive a portion of a support structure, preferably the support structure is a T-grid support for use with a suspended ceiling.

Yet another embodiment of this technology offers a luminaire with means for providing illumination. The illumination means is supported by first and second hanger bar members where the first hanger bar member has an elongated slot and the second hanger bar includes means for retaining the second hanger bar member adjacent the first hanger bar member. The means for retaining extend into the elongated slot and slidably engage the first hanger bar member. The first and second hanger bar members further include means for attaching the first and the second hanger bar members to a respective support structure, the attaching means being disposed on a proximal end of each of the first and second hanger bar members.

BRIEF DESCRIPTION OF THE DRAWINGS

Various aspects of the invention will now be described with reference to the following figures ("FIGS.") in which the same reference numerals are used to designate corresponding parts throughout each of the several views.

FIG. 1 is a bottom view of a recessed luminaire installation including two hanger bar assemblies.

FIG. 2 is an exploded view of a hanger bar assembly in FIG. 1 where the top plane corresponds to front plane of FIG. 1.

FIG. 2A is a detailed view of the score line configuration shown in FIG. 2.

FIG. 3A is an enlarged front view of an end portion of the hanger bar system of FIG. 2.

FIG. 3C is an enlarged side view of an end portion of the hanger bar system of FIG. 2.

FIG. 4 is an assembled view of the hanger bar assembly of FIG. 2 connected to a plaster plate and arranged in a fully-extended configuration where the side plane corresponds to the top plane of FIG. 2.

FIG. 6 is an enlarged rear view of the hanger bar assembly of FIG. 5 arranged in a shorter configuration than FIG. 5.

FIG. 8 is an oblique view of the hanger bar system as shown in FIG. 4, in a retracted position.

FIG. 9 is a side view of the hanger bar assembly shown in FIG. 4.

FIG. 10 is a cross-sectional view taken along line 10-10 in FIG. 9.

FIG. 11 is a cross-sectional view taken along line. 11-11 in FIG. 9.

FIG. 12 is a cross-sectional view taken along line 12-12 in FIG. 9.

FIG. 13 is a cross-sectional view taken along line 13-13 in FIG. 9.

FIG. 14 is a partial sectional view of a securing arrangement for a hanger bar system constructed according to the invention.

DETAILED DESCRIPTION OF THE PREFERRED EMBODIMENTS

Figure 3B:
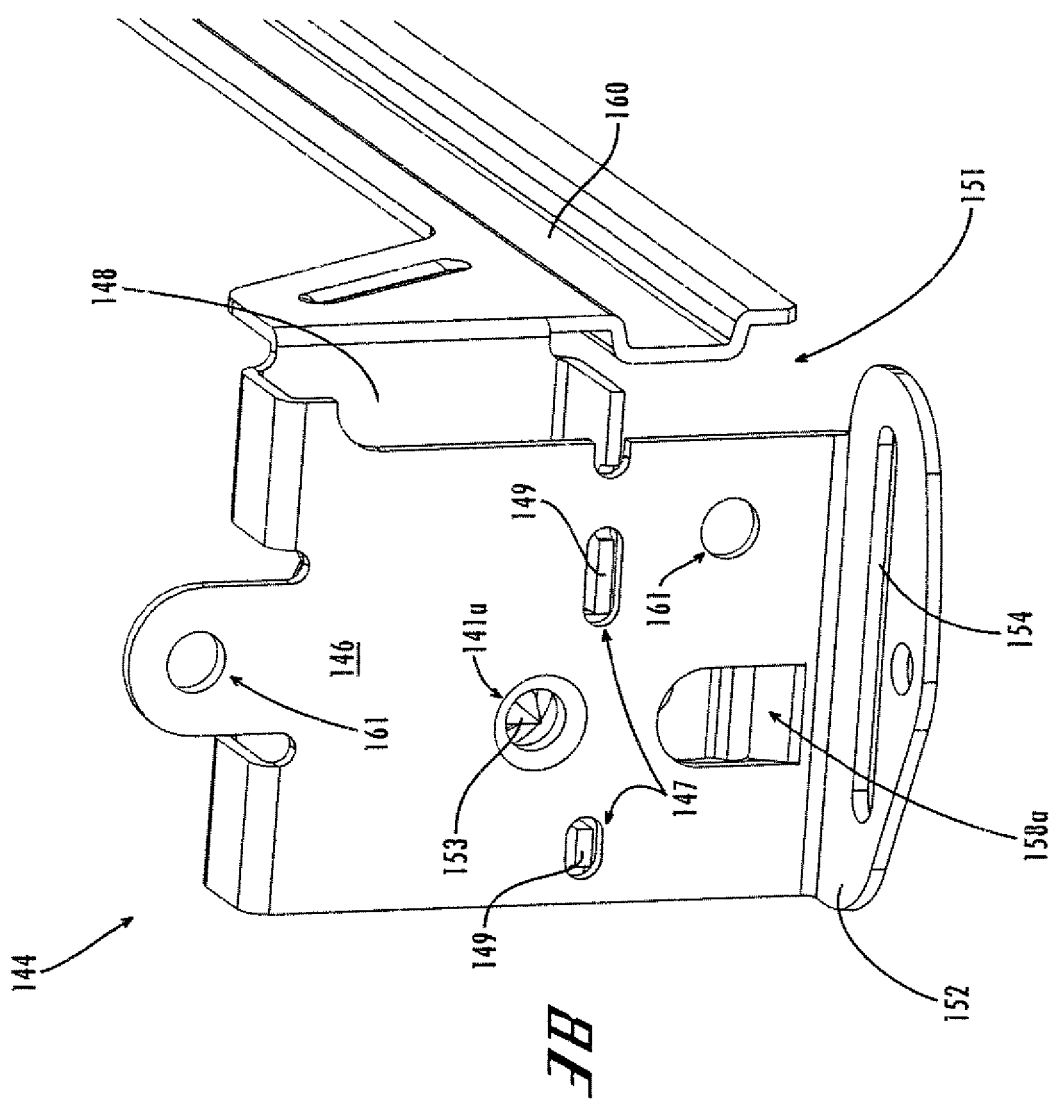
FIG. 3B is an enlarged rear view of an end portion of the hanger bar system of FIG. 2.

FIG. 1 illustrates a typical installation for a recessed luminaire 100 including a pair of spaced hanger bar assemblies 102. Although a recessed downlight is illustrated in FIG. 1, the hanger bar assemblies may be used with a variety of other recessed and non-recessed luminaires, and/or other devices. The hanger bar assemblies 102 are preferably attached at each end to horizontal parallel support members, such as the joists 104 shown in FIG. 1, suspended ceiling T-grids 105 shown in FIG. 15, and/or steel framing. However, they may also be attached to a variety of other support members that are neither horizontal or parallel.

The hanger bar assemblies 102 support what is broadly referred to here as a suspended member 106. In FIG. 1, the illustrated suspended member includes a housing or "can" 108 that rests on a plaster plate or "frame" 110. The plaster plate 110 includes attachment tabs 112 that attach the plaster plate 110 to the hanger bar assemblies 102. The attachment tabs 112 may also help to secure the individual hanger bar members of the hanger bar assembly 102 adjacent to each other as discussed below.

As illustrated in FIG. 2, each hanger bar assembly 102 includes a first hanger bar member 120 and a second hanger bar member 160. The first hanger bar member 120 has a first end 122 with chamfered corners 126. For example, the corners can be chamfered at a 45 degree angle relative to the longitudinal direction. However, a variety of other edge finishing techniques and/or surface preparations may also be used.

The first hanger bar member 120 includes an elongated slot 130 which is spanned by a first reinforcing bridge 140 to form a first slot portion 131 and a second slot portion 133. In its preferred form, the first slot portion 131 of the elongated slot 130 has a first width 132 near its first end 122 that extends along a substantial portion of its length. The elongated slot 130 may also include a second width 134 at the other end, which is greater than the first width 132. As shown in FIG. 2, the second width 134 of the first slot portion 131 is preferably provided in the area of the first reinforcing bridge 140.

An angled transitional surface 136 (best illustrated in FIG. 9) connects the first width 132 with the second width 134. For example, the angled surface 136 can be disposed at a 45 degree angle relative to the longitudinal direction as shown in FIG. 9. However, a variety of other angles and/or curves may be used to form the transitional surface 136.

Any number of score lines 138 may be formed across the width of the first hanger bar member 120. The precise form and dimensions of the score lines 138 can vary widely. However, in the example illustrated here, the score lines 138 are straight lines and are approximately 0.02 inches deep. In the event that it becomes necessary to fit between relatively narrowly spaced support members, the first hanger bar member 120 can be broken along the score lines 138 to shorten its length. Note, multiple first score lines 138 can be provided on the first hanger bar member 120. For example, as illustrated in FIG. 2 the score lines may be spaced to account for standard support structure spacings at 1 inch, 4 inches, and 5 inches from the end of the end 122. Although the score lines 138 are illustrated here as extending across the entire width of the hanger bar member 102, they may alternatively extend only part way across the width of the hanger bar member.

Furthermore, as shown in the score line detail of FIG. 2 and FIG. 2A, one or more of the score lines 170 and/or 138 may be arranged with parallel scores on the top and bottom surfaces of the hanger bar for member 120. In the illustrated example, the score line 170 is spaced by a dimension A of about 0.036 inches and include a notch or radius with a dimension B of about 0.016 inches. It has been found that these dimensions provide a hanger bar with sufficient strength without having to provide a break aperture or other hole through the score line such as the score line 170 detailed in the FIGs.

A second reinforcing bridge 142 reaches from one end of the second slot portion 133 to a second end 124 of the first hanger bar member 120. The second slot portion 133 also includes first width 132, which extends along a substantial portion of the longitudinal dimension of the slot portion 133, and wider a second width 134. The second width 134 is provided at both ends of the second slot portion 133 which may also include a transition sections similar to transition section 134 in the slot portion 131.

Also provided at the second ends 124 and 161 of the first and second hanger bar members 120 and 160 are attachment structures 144 for securing the hanger bar members to a support, such as a wooden joist 104 (FIG. 1), ceiling T-grid 105 (FIG. 15), and/or steel framing. The attachment structures 144 may be integrally formed with the first hanger bar member 120, as illustrated here, or they may be separately formed and subsequently attached to the second end 124.

Referring now to FIGS. 3A-3C, the attachment structures 144 include a first wall 146 and a second wall 148 that are parallel to one another and perpendicular to the respective hanger bar member (as shown, second hanger bar member 160). The first wall 146 and second wall 148 are configured such that the second ends 124 and 164 of the opposing hanger bar member 120 and 160, respectively, can slide beyond the attachment structures 144 when the hanger bar assembly 102 is in a retracted position (FIG. 8).

As best shown in FIGS. 3A and 3B, the second wall 148 includes a fastener aperture 141 formed therein and one or more brace stubs 149 that extend inwardly toward the first wall 146 from the lower edge of the second wall 148. Preferably, the distal ends of the brace stubs 149 are received in stub apertures 147 that are formed in the first wall 146. The brace stubs 149 are configured to maintain desired spacing between the first wall 146 and second wall 148 when driving fasteners into support members, such as wooden joists 104 (FIG. 1), as discussed hereafter. Preferably, the fastener aperture 141 is configured such that a friction fit is maintained on a fastener 153 (FIG. 3C) positioned therein. As such, installation of the hanger bar assembly 102 does not require that the fastener 153 be held in place by the person performing installation. Note, additional apertures 161 are provided on the attachment structure 144 to permit various placement of fasteners 153 depending upon the mounting requirements.

As shown in FIG. 3B, the first wall 148 includes an aperture 141a that corresponds to the fastener aperture 141 and a mounting flange 152 that depends outwardly from the lower edge of the first wall 146, such that the first wall 146 and the mounting flange 152 are substantially perpendicular. As previously noted, the fastener aperture 141 maintains a friction fit with the fastener 153. The corresponding aperture 141a has a diameter that is slightly larger than the diameter of the fastener 153, thereby allowing unimpeded passage of the fastener 153. As well, the corresponding aperture 141a includes a lip which depends inwardly toward the second wall 148. As best seen in FIG. 3C, the inwardly depending lip of the corresponding aperture 141a is configured to guide the tip of the fastener 153 as it is driven through the corresponding aperture 141a and into the adjacent support member.

As best seen in FIG. 1, when mounting the first and second hanger bar members 120 and 160 to a support member such as a joist 104, the attachment structure 144 is positioned adjacent the joist 104 such that the first wall 146 and mounting flange 152 are positioned adjacent the side surface and bottom surface of the joist 104, respectively. Once the attachment structure 144 is placed in a desired position relative to the joist 104, a fastener 153, such as a screw, nail, etc., is driven through the fastener aperture 141 and corresponding aperture 141a into the side surface of the joist 104. As previously noted, the fastener 153 is preferably maintained in the fastener aperture 141 so that the individual installing the hanger bar assembly 102 need not maintain the fastener 153 in position during installation. For example, as illustrated in the FIGs., the fastener 153 may be a nail with lands and grooves arranged near the end of the nail for holding it in the aperture 141. Fully or partially threaded screws, bolts, posts, and/or other ridged fasteners may also be used. Installation is also possible by driving a fastener through any of the various apertures 161 located on the attachment structure 144.

Besides driving a fastener 153 into the side surface of the joist 104, an individual can select to drive an optional fastener (see FIG. 1) through a slot 154 formed in the mounting flange 152 and into the bottom surface of the joist 104. By partially driving the optional fastener through the slot 154, the individual can now slide the attachment structure 144 longitudinally along the joist 104 over the length of the slot 154. As such, the attachment structure 144 can be manipulated until the desired position is found relative to the joist 104, at which point in time the optional fastener is fully driven into the joist 104 such that the attachment structure 144 and associated hanger bar member are maintained in the desired position. The individual may then install additional fasteners through the fastener aperture 141 and/or additional apertures 161 to further secure the hanger bar assembly 102 to the joist 104.

Figure 15:
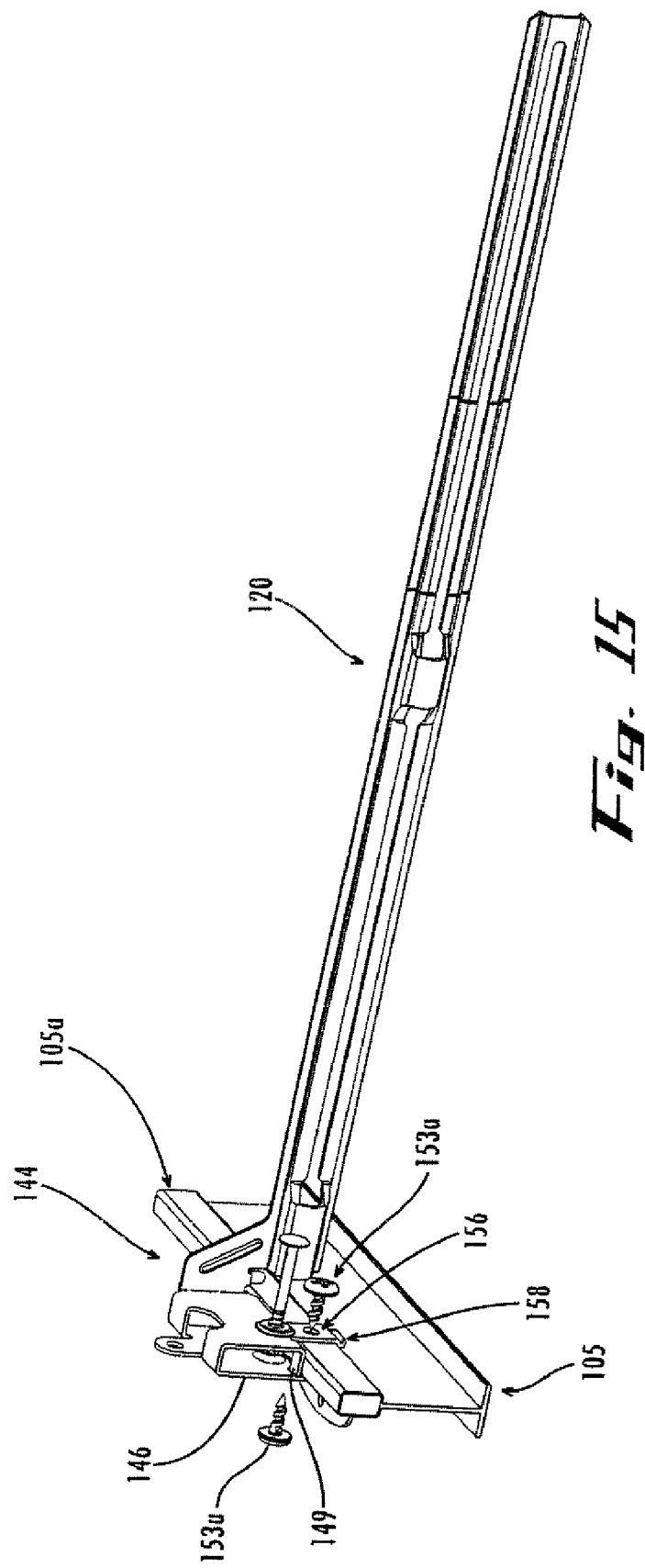
FIG. 15 is a partial perspective view of the hanger bar system of FIG. 2, mounted to a support member for a suspended ceiling.

As best shown in FIG. 3C, the second wall 148 includes a mounting tab 156 extending downwardly from its lower edge. The lower portion of the first wall 146 and the mounting tab 156 form a gap 155 that is configured to receive the upper rail 105a of a standard suspended ceiling T-grid 105, as shown in FIG. 15. As well, opposing catches 158 and 158a are formed on the lower edge of the mounting tab 156 and the first wall 146, respectively, such that the attachment structure 144 positively engages the upper rail 105a of the T-grid 105. Because the brace stubs 149 of the second wall 148 engage the stub apertures 147 of the first wall 146, the brace stubs 149 form a solid platform for resting on the upper surface of the rail 105a. The attachment structure 144 is secured relative to the T-grid 105 by driving a fastener 153A, (FIG. 15) preferably a metal screw, through the desired aperture 161 that is positioned adjacent the rail 105a of the T-grid 105.

A second hanger bar member 160 nests with the first hanger bar member 120 and includes a first end 162 with chamfered corners 164 similar to the chamfered corners 126 of the first hanger bar member 120. Preferably, first, second, and third retaining projections 166, 167, and 168 are provided near the first end 162 of the second hanger bar member 160. The retaining projections 166, 167 and 168 may be cut from the surface of the second hanger bar member 160 and unfolded to provide the form illustrated in FIG. 2. Alternatively, the retaining projections 166, 167 and 168 may be separately formed then attached to the surface of the second hanger bar member 160. Note, alternate embodiments can include either fewer than, or more than, three retaining projections.

Figure 5:
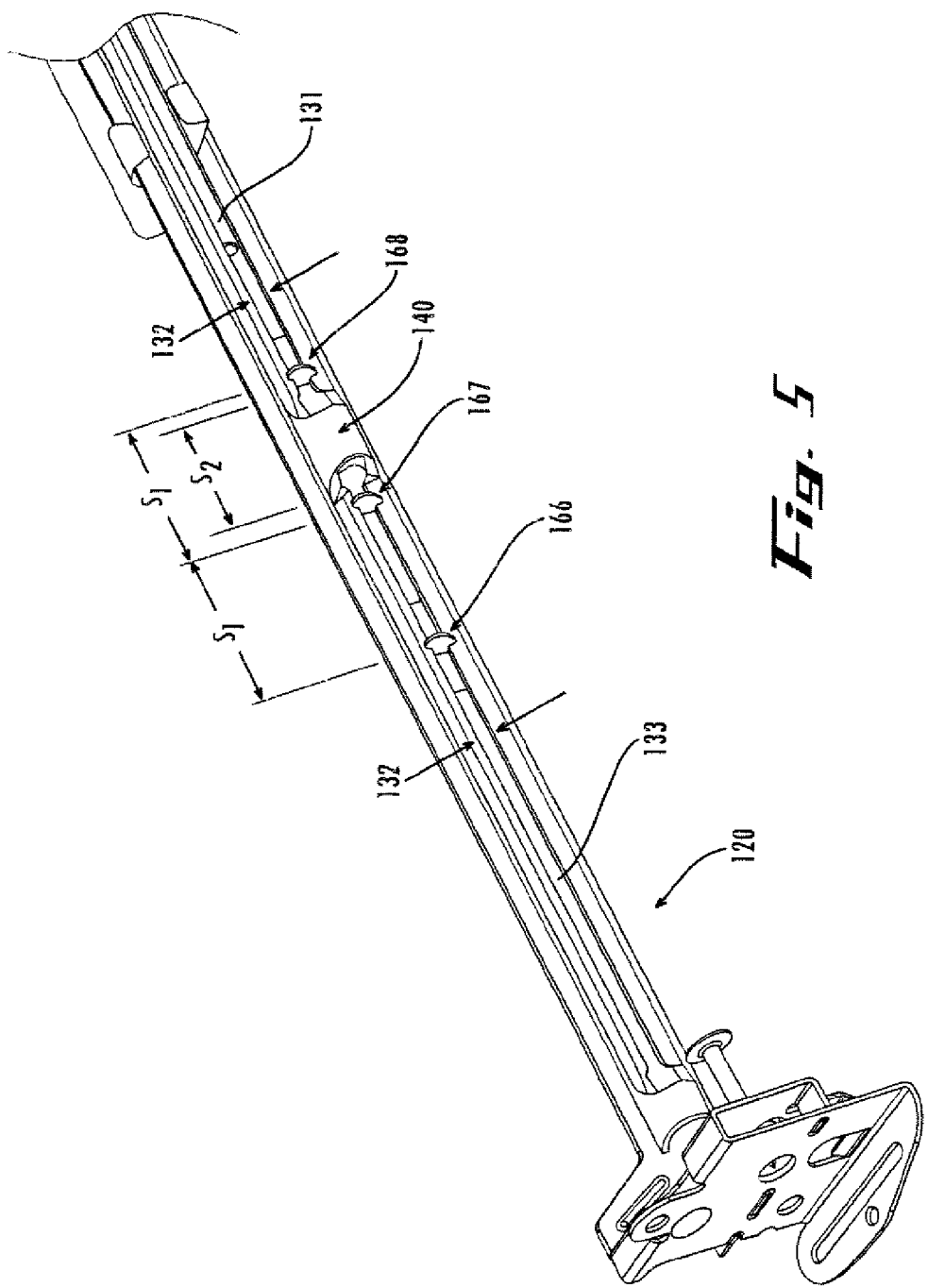
FIG. 5 is an enlarged view of an end portion of the hanger bar system of FIG. 4, arranged in a partially-extended configuration.

The retaining projections 166, 167, and 168 are received within the first and/or second slot portions 131 and 133 of the first hanger bar member 120 in order to couple the hanger members 120 and 160 together in a longitudinally adjustable manner. The head of each retaining projection is greater in width than the first width 132 of the slot portions 131 and 133, but is smaller than the second width 134. As best illustrated in FIG. 5, the retaining projections 166, 167 and 168 are dimensioned so as to pass freely under the first and second reinforcing bridges 140 and 142 as the first and second hanger bar members 120 and 160 are longitudinally moved relative to each other.

Additional score lines 170 may be provided across the width of the second hanger bar member 160. As with the score lines 138, the precise form and depth may vary widely according to the material strength and thickness of the hanger bar members. For example, the second score line 170 may be a straight line formed to a depth of approximately 0.02 inches. Since second hanger bar member 160 is of a solid cross-section, unlike the slotted first hanger bar member 120, it is more difficult to break along the second score line 170. Therefore, an optional score window or aperture 172 may be provided in the area of the score lines 170 in order to facilitate breakage of the second hanger bar member. As noted above, the need for such a break aperture may be avoided by using a score line configuration similar to that for score lines 170.

In the event that it becomes necessary to fit the hanger bar assembly 102 into a relatively narrow space, the second hanger bar member 160 may be broken along any of the second score lines 170. As shown in FIG. 2, breaking the second hanger bar member 160 along the second score line 170 removes the end of the hanger bar 160 having the retaining projections 166, 167 and 168. However, the first and second hanger bar members 120 and 160 are still adequately retained by the attachment tabs 112 formed on the plaster plate 110, as shown in FIG. 8. It is also possible to simply bend the first and second hanger bar members 120 and 160 as necessary to fit the hanger bar assembly into a narrow space.

Another attachment structure 144 is provided at the second end 164 of the second hanger bar member 160. In one form, the attachment structure 144 disposed at the second end 164 has the same construction as the first attachment structure located at the second end 124 of the first hanger bar member 120. The elements of such an attachment structure 144 have been previously described in connection with the description of first hanger bar member 120. However, in the embodiment illustrated here, a gap 151 is formed between the second end 164 and the first wall 146 such that a portion of the first hanger bar member 120 can slide beyond the attachment structure 144 when the hanger bar assembly 102 is in a retracted position.

As mentioned above, the first and second hanger bar members 120 and 160 are secured together in a nested manner. In this regard, the first hanger bar member 120 has a first surface 121 that faces the second hanger bar 160 when assembled, and a second opposing surface 123. The second hanger bar member 160 includes a third surface 161 which faces away from the first hanger bar 120 when assembled, and a fourth surface 163 which faces the first hanger bar 120. When the first and second hanger bar members 120 and 160 are connected, the first and fourth surfaces 121 and 163 are received within each other in a nesting relationship. The second surface 123 faces outwardly (e.g., away from the suspended member 106) and the third surface 161 faces inwardly (e.g., toward the suspended member 106).

As previously noted, the retaining projections 166, 167 and 168 may pass freely through the second width 134 without interference. The larger second width areas 134 facilitate the assembly of the first and second hanger bar members 120 and 160. For example, in one method of assembly, the first end 122 of the first hanger bar member 120 is inserted through the gap 151 formed between the fourth surface 163 and first wall 146 of the second hanger bar member 160. The first hanger bar member 120 is then slid longitudinally until at least the second width 134 portion formed on the second bridge 142 has cleared the third retaining projection 168.

The first hanger bar member 120 is then urged toward the second hanger bar member 160 until the first surface 121 of the first hanger bar member 120 is adjacent the fourth surface 163 of the second hanger bar member 160. The third retaining projection 168 is first passed through the second width 134 near the second reinforcing bridge 142. The second hanger bar 160 is then moved back relative to the first hanger bar member 120 in the direction of the first end 122.

The third retaining projection 168 travels in the first width 132 of the second slot portion 133. The second and first retaining projections 167 and 166 are then inserted through the second width 134 near the second reinforcing bridge 142. As the second hanger bar member 160 is moved toward the first end 122, the second and first retaining projections 167 and 166 subsequently engage the first width portion 132 of the second slot portion 133, thereby securing the first and second hanger bar members 120 and 160.

Once the first and second hanger bar members 120 and 160 are connected, the resulting hanger bar assembly 102 is freely adjustable in a lengthwise, or longitudinal, direction. The hanger bar assembly 102 is shown in its fully extended position in FIGS. 4 and 9. FIG. 4 also shows a plaster plate 110 slidably attached to the hanger bar assembly 102 by attachment tabs 112 which are configured to slidably receive and maintain the first and second hanger bar members 120 and 160 adjacent each other.

One advantage of the illustrated configuration is that, as the first and second hanger bar members 120 and 160 are moved relative to each other, at least two of the retaining projections 166, 167, and 168 are engaged within one of the elongated slot portions 131 and 133. One exception to this mode of operation occurs when both the first and second projections 166 and 167, or all of the projections, have been passed through the second width 134 of slot portion 133 proximate the second reinforcing bridge 142. As illustrated in FIG. 5, this capability is provided by arranging the retaining projections 166, 167 and 168 with a predetermined spacing $S_1$ between adjacent projections. The projection spacing $S_1$ is preferably at least slightly larger than the distance $S_2$ between the first width regions 132 of the first and second slot portions 131 and 133, which are separated by the first reinforcing bridge 140. However, configurations are envisioned having fewer than three retaining projections.

As illustrated in FIG. 6, a retaining tab 135 is disposed on the first hanger bar member 120 near the attachment structure 144 on the second end 124. The retaining tab 135 extends outwardly and downwardly from the first hanger bar member 120 opposite the second bridge 142. The retaining tab 135 slidably engages the first end 162 of the second hanger bar member 160 as the first retaining projection 166 passes out of the second slot portion 133 of the first hanger bar member 120. In this way, the retaining tab 135 maintains the first and second hanger bar members 120 and 160 adjacent to each other as the hanger bar assembly 102 is partially retracted.

Figure 7H:
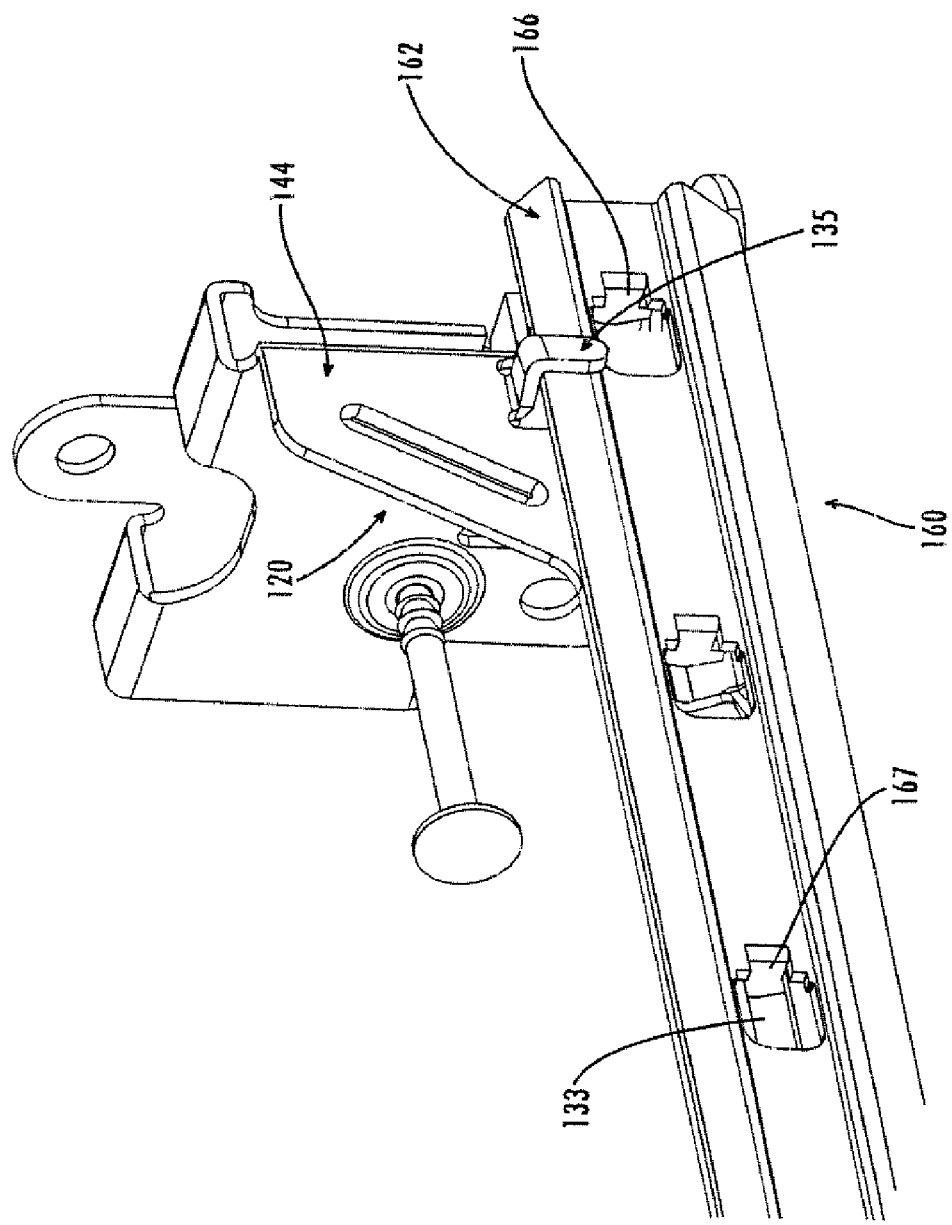
FIG. 7A is a sequential view of the hanger bar assembly of FIG. 6 arranged in a shorter configuration than FIG. 6.
FIG. 7B is a rear view of the hanger bar assembly of FIG. 7A arranged in the same configuration as FIG. 7A.

FIGS. 7A and 7B show the attachments portions 144 of the engaged hanger bar members being slid toward each other. As best seen in FIG. 7B, both the first and second retaining projections 166 and 167 have exited the second slot portion 133, and the first end 162 of the second hanger bar member 160 has been extended beyond the attachment structure 144 of the first hanger bar member 120. In this position, the third retaining projection 168 remains within the second slot portion 133, thereby maintaining the first and second hanger bar members 120 and 160 adjacent one another. FIG. 7B also shows that the gap 151 formed on the attachment structure 144 as it accommodates passage of the retaining projection 166 and thereby permits the first end 162 of the second hanger bar member to extend beyond the attachment structure 144. Similarly, the attachment structure 144 of the second hanger bar member 160 also allows the first end 122 of the first hanger bar member 120 to extend therebeyond.

FIG. 8 shows the hanger bar assembly 102 in a retracted position wherein the front ends 122 and 162 of the first and second hanger bar members 120 and 160, respectively, extend beyond the attachment structure 144 of the other hanger bar member. As well, the first and second score lines 138 and 170 also extend beyond the attachment structures 144 such that portions of each hanger bar member 120 and 160 can be removed while the hanger bar members 120 and 160 are still adjacent each other. This permits the overall length of the hanger bar assembly 102 to be reduced without having to remove the hanger bar assembly 102 from the plaster frame 110. Once the retaining projections 166, 167 and 168 have been removed from the second hanger bar member 160, the first and second hanger bar members 120 and 160 are held adjacent one another by the opposed attachment tabs 112 on the plaster frame 110.

The cross-sectional details of the hanger bar assembly according to the present invention are best illustrated in FIGS. 10-14, which are taken along the section lines shown in FIG. 9. FIG. 10 shows the first and second hanger bar members 120 and 160 in a nested relationship. As previously described and illustrated in FIG. 2, the first hanger bar member 120 has a first surface 121 and a second surface 123. The first surface 121 has a generally concave groove 127 disposed along a substantial portion of the longitudinal length of the first hanger bar member 120. The second surface 123 has a generally convex ridge 129 corresponding to the concave groove 127 formed on the first surface 121. The third surface 161 of the second hanger bar member 160 has a generally concave groove 167 extending along a substantial portion of longitudinal length of the second hanger bar member 160. The second hanger bar member 160 further has a generally convex ridge 169 disposed on the fourth surface 163 corresponding to the concave groove 127. As illustrated in FIG. 10, the generally convex ridge 169 is received in the generally concave groove 127 in a nested manner.

FIG. 11 is a cross-sectional view of the first hanger bar member 120 showing the first width 32 of the elongated slot 130. FIG. 11 is a cross-sectional view of the first hanger bar member 120 showing the second width 134 of the elongated slot 130 and just prior to a reinforcing formation. FIG. 13 is cross-sectional view of the first hanger bar member 120 showing a reinforcing formation in an area that does not include any elongated slot 130.

The first and second reinforcing formations 140 and 142 each have a generally concave reinforcing depression 143 disposed along first surface 121 and a generally convex reinforcing protrusion 145 or ridge formed along the second surface 123. As illustrated for example in FIG. 12, the generally concave groove 127 that extends along a substantial portion of the first hanger bar member 120 defines a first plane $P_1$. By comparison, the generally concave reinforcing depressions 143 extend beyond the plane $P_1$ and are therefore formed deeper into the first hanger bar member 120. Similarly, the generally convex ridge 129 that extends along a substantial portion of the longitudinal length of the first hanger bar member 120 defines a second plane $P_2$. The reinforcing depression 143 extends beyond plane $P_2$ so as to project from the surface of the first hanger bar member 120 and thereby allow passage of retaining projections 166, 167 and 168 therethrough.

Various embodiments of the present invention may also include a securing arrangement such as the one illustrated in FIG. 14. The securing arrangement for the hanger bar system fixes the position of the first and second hanger bar members 120 and 160 to each other, as well as fixes the position of the hanger bar assemblies 102 relative to the suspended member. As shown in FIG. 14, the plaster plate 110 includes attachment tabs 112 that retain the first and second hanger bars 120 and 160. A securing fastener 180, such as a threaded screw, is received in a guide flange member 182. An aperture 184 is provided in the plaster plate 110 to provide access to the securing fastener 180.

As the securing fastener 180 is tightened, it comes into contact with a surface of the second hanger bar member 160. As a result of this contact, the first and second hanger bars 120 and 160 come into firmer engagement with each other as well as with the attachment tabs 112. Therefore, this increased contact pressure prevents both the first and second hanger bar members 120 and 160 from moving relative to each other and the hanger bar members 120 and 160 from moving relative to the attachment tabs 112 and the plaster plate 110.

Although various preferred embodiments have been discussed here, numerous other embodiments of the present invention are envisioned. For example, the first bar hanger 120 member may include more than one reinforcing bridge 140 spanning the elongated slot 130, with more than two slot portions will exist. Similarly, as few as two retaining projections may be disposed on the second hanger bar member 160. In yet another variation, the gap 151 may be removed from the attached structures 144 where the structures do not extend far enough down so as to impede the passage of the front end of either bar member 120, 160 or the retaining projections.

It should be emphasized that the embodiments described above, and particularly any "preferred" embodiments, are merely examples of various implementations that have been set forth here to provide a clear understanding of various aspects of the invention. One of ordinary skill will be able to alter many of these embodiments without substantially departing from scope of protection defined solely by the proper construction of the following claims.

The invention claimed is:

1. A hanger bar assembly comprising:
   a first hanger bar member comprising a first rail comprising a first end, a second end, and a first attachment structure disposed on the first end;
   a second hanger bar member comprising a second rail comprising a first end, a second end, and a second attachment structure disposed on the first end, the second hanger bar member being adjacent to the first hanger bar member, wherein the second hanger bar member slidably engages the first hanger bar member;
   wherein the first and the second attachment structures each comprise a first fastener aperture, a first wall, and a second wall and wherein the first wall comprises the first aperture and the second wall comprises a second aperture;
   a first fastener maintained in the first fastener aperture of the first attachment structure;
   a second fastener maintained in the first aperture of the second attachment structure; and
   wherein the first and second attachment structures permit the second end of the first rail to slide from between the first and second attachment structures, past the second attachment structure and the second end of the second rail to slide from between the first and second attachment structures, past the first attachment structure when the first and second hanger bar members are slidably engaged.

2. The hanger bar assembly of claim 1, wherein the second fastener apertures are configured to allow the first and the second fasteners to pass therethrough in an unimpeded fashion.

3. The hanger bar assembly of claim 1, wherein the first wall and the second wall of each of the first and the second attachment structures are substantially parallel to one another.

4. The hanger bar assembly of claim 1, further comprising at least a first stub extending between the first wall and the second wall of the first attachment structure, and a second stub extending between the first wall and the second wall of the second attachment structure, wherein the first and second stubs are configured to maintain separation between their respective first and second walls.

5. The hanger bar assembly of claim 4, wherein the first and the second stubs each extends from the respective first wall and toward the respective second wall.

6. The hanger bar assembly of claim 1, wherein the first fastener and the second fastener are each maintained in one of the first fastener apertures by a friction fit.

7. The hanger bar assembly of claim 1, wherein each of the first and the second fasteners is a nail.

8. The hanger bar assembly of claim 1, wherein each of the first and the second fasteners is a screw.

9. The hanger bar assembly of claim 1, further comprising a mounting flange extending outwardly from an edge of at least one of the first attachment structure and the second attachment structure, the first mounting flange being substantially perpendicular to the respective attachment structure.

10. The hanger bar assembly of claim 9, further comprising a first mounting slot in the mounting flange.

11. A luminaire, comprising:
    a lamp disposed within a housing;
    a frame coupled to the housing, the frame comprising a plurality of attachment tabs;
    a hanger bar assembly, wherein at least a portion of the hanger bar assembly is slidably coupled to at least a portion of the attachment tabs, the hanger bar assembly comprising:
       a first hanger bar member comprising a first rail comprising a first end, a second end, and a first attachment structure disposed on the first end;
       a second hanger bar member comprising a second rail comprising first end, a second end, and a second attachment structure disposed on the first end, the second hanger bar member being adjacent to the first hanger bar member, wherein the second hanger bar member slidably engages the first hanger bar member;
       wherein the first and the second attachment structures each comprise a first fastener aperture;
       a first fastener maintained in the first fastener aperture of the first attachment structure;
       a second fastener maintained in the first aperture of the second attachment structure; and
       wherein the first and second attachment structures permit the second end of the first rail to slide from between the first and second attachment structures, past the second attachment structure and the second end of the second rail to slide from between the first and second attachment structures, past the first attachment structure when the first and second hanger bar members are slidably engaged.

12. The luminaire of claim 11, wherein the first and second attachment structures each comprise a first wall and a second wall, wherein the first wall comprises the first aperture and the second wall comprises a second aperture and wherein at least a portion of the first and second apertures are horizontally aligned with each other.

13. The luminaire of claim 12, wherein the second fastener apertures are configured to allow the first and the second fasteners to pass therethrough in an unimpeded fashion.

14. The luminaire of claim 12, wherein the first wall and the second wall of each of the first and the second attachment structures are substantially parallel to one another.

15. The luminaire of claim 12, further comprising at least a first stub extending between the first wall and the second wall of the first attachment structure, and a second stub extending between the first wall and the second wall of the second attachment structure, wherein the first and second stubs are configured to maintain separation between their respective first and second walls.

16. The luminaire of claim 15, wherein the first and the second stubs each extends from the respective first wall and to the respective second wall.

17. The luminaire of claim 11, wherein the first fastener and the second fastener are each maintained in one of the first fastener apertures by a friction fit.

18. The luminaire of claim 11, wherein each of the first and the second fasteners is a nail.

19. The luminaire of claim 11, further comprising a mounting flange extending outwardly from an edge of at least one of the first attachment structure and the second attachment structure, the first mounting flange being substantially perpendicular to the respective attachment structure.

20. A hanger bar assembly comprising:
    a first hanger bar member comprising a first rail comprising a first end, a second end, and a first attachment structure disposed on the first end;
    a second hanger bar member comprising a second rail comprising a first end, a second end, and a second attachment structure disposed on the first end, the second hanger bar member being adjacent to the first hanger bar member, wherein the second hanger bar member slidably engages the first hanger bar member;

a mounting flange extending outwardly from an edge of at least one of the first attachment structure and the second attachment structure, the first mounting flange being substantially perpendicular to the respective attachment structure;

wherein the first and the second attachment structures each comprise a first fastener aperture;

a first fastener maintained in the first fastener aperture of the first attachment structure;

a second fastener maintained in the first aperture of the second attachment structure; and wherein the first and second attachment structures permit the second end of the first rail to slide from between the first and second attachment structures, past the second attachment structure and the second end of the second rail to slide from between the first and second attachment structures, past the first attachment structure when the first and second hanger bar members are slidably engaged.

* * * * *